US012689582B2

(12) United States Patent
Li et al.

(10) Patent No.: US 12,689,582 B2
(45) Date of Patent: Jul. 21, 2026

(54) PACKET PROCESSING METHOD AND APPARATUS, AND NETWORK DEVICE AND MEDIUM

(71) Applicant: New H3C Technologies Co., Ltd., Zhejiang (CN)

(72) Inventors: Hao Li, Beijing (CN); Changwang Lin, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 233 days.

(21) Appl. No.: 18/563,785

(22) PCT Filed: Sep. 30, 2021

(86) PCT No.: PCT/CN2021/122183
§ 371 (c)(1),
(2) Date: Nov. 22, 2023

(87) PCT Pub. No.: WO2023/050313
PCT Pub. Date: Apr. 6, 2023

(65) Prior Publication Data
US 2024/0283733 A1 Aug. 22, 2024

(51) Int. Cl.
*H04L 45/00* (2022.01)
*H04L 45/76* (2022.01)
(52) U.S. Cl.
CPC .............. *H04L 45/34* (2013.01); *H04L 45/76* (2022.05)
(58) Field of Classification Search
None
See application file for complete search history.

(56) References Cited

U.S. PATENT DOCUMENTS

| | | | | | |
|---|---|---|---|---|---|
| 10,904,152 | B2 * | 1/2021 | Ali | ......................... | H04L 1/0061 |
| 2020/0076727 | A1 * | 3/2020 | Filsfils | .................. | H04L 43/106 |
| 2021/0075697 | A1 | 3/2021 | Dattagupta et al. | | |
| 2021/0084009 | A1 | 3/2021 | Du et al. | | |

(Continued)

FOREIGN PATENT DOCUMENTS

| | | |
|---|---|---|
| CN | 110266594 A | 9/2019 |
| CN | 112770196 A | 5/2021 |
| CN | 112817688 A | 5/2021 |

(Continued)

*Primary Examiner* — Xavier S Wong
(74) *Attorney, Agent, or Firm* — McDonnell Boehnen Hulbert & Berghoff LLP

(57) ABSTRACT

An example method comprises: generating a first packet, wherein a source address in the first packet comprises a network segment, a host segment, and a slice segment that comprises a slice identifier; sending the first packet to a destination node, so that if the destination node, after receiving the first packet, determines according to the network segment and the host segment that the source address in the first packet belongs to a specified slice network segment, the destination node clears the slice segment in the source address, uses the source address whose slice segment has been cleared as a destination address of a second packet, and sends the second packet to the head node; receiving the second packet; and if the destination address is the same as a host address of the head node, delivering the second packet up to a control plane. Thus, the second packet can be correctly delivered up to the control plane.

10 Claims, 3 Drawing Sheets

(56)                        References Cited

U.S. PATENT DOCUMENTS

2022/0407802 A1*  12/2022  Xiao ....................... H04L 45/50
2024/0106749 A1     3/2024  Bao et al.

FOREIGN PATENT DOCUMENTS

CN        112910773  A     6/2021
CN        113411834  A     9/2021
WO        2021008515 A1    1/2021
WO        2021185208 A1    9/2021

* cited by examiner

| Network segment | Host segment |
|---|---|

| Network segment | Host segment | Slice segment |
|---|---|---|

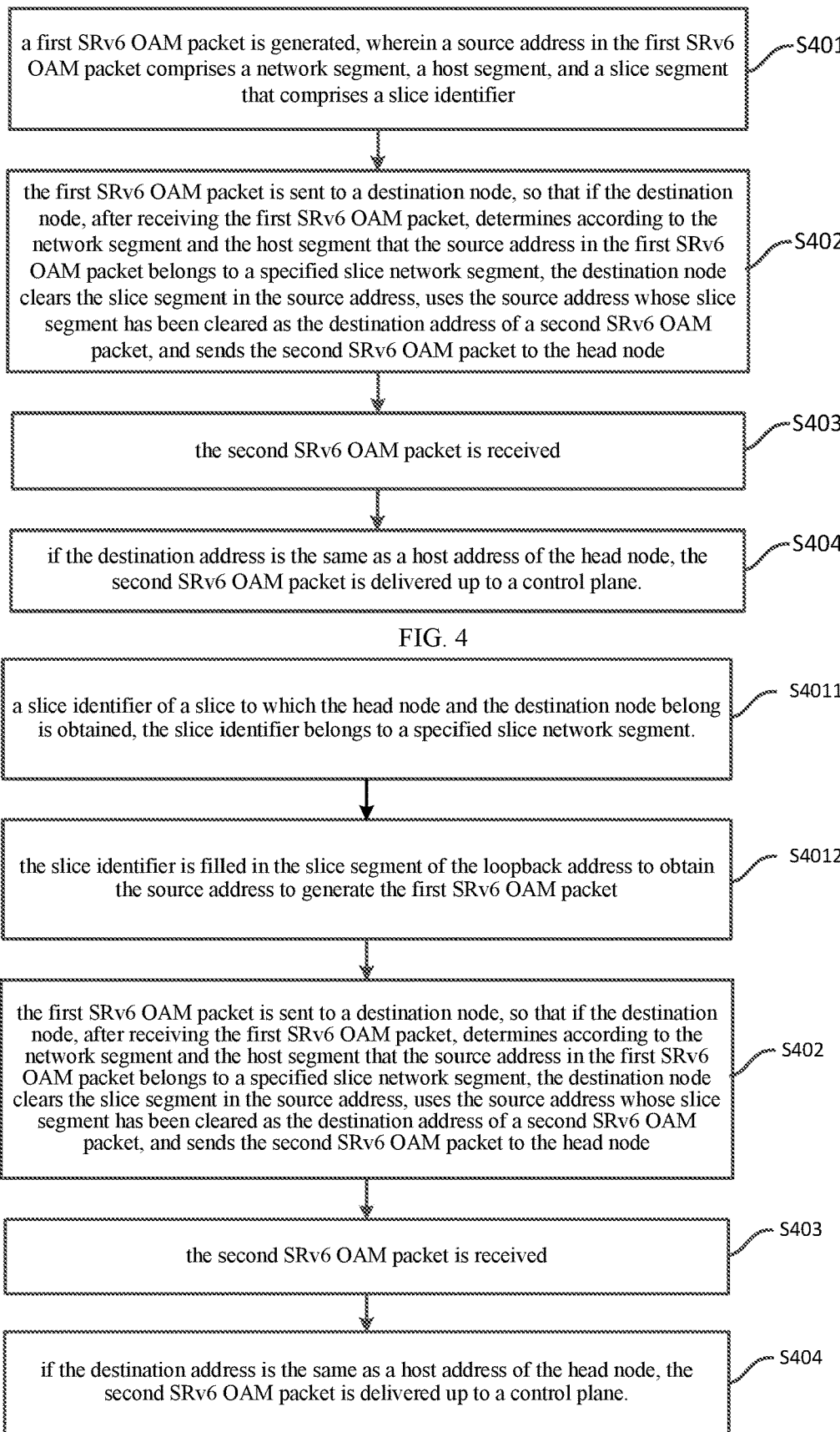

a first SRv6 OAM packet is generated, wherein a source address in the first SRv6 OAM packet comprises a network segment, a host segment, and a slice segment that comprises a slice identifier ⟋~S401 the first SRv6 OAM packet is sent to a destination node, so that if the destination node, after receiving the first SRv6 OAM packet, determines according to the network segment and the host segment that the source address in the first SRv6 OAM packet belongs to a specified slice network segment, the destination node clears the slice segment in the source address, uses the source address whose slice segment has been cleared as the destination address of a second SRv6 OAM packet, and sends the second SRv6 OAM packet to the head node ⟋~S402 the second SRv6 OAM packet is received ⟋~S403 if the destination address is the same as a host address of the head node, the second SRv6 OAM packet is delivered up to a control plane. ⟋~S404

FIG. 4 a slice identifier of a slice to which the head node and the destination node belong is obtained, the slice identifier belongs to a specified slice network segment. ⟋~ S4011 the slice identifier is filled in the slice segment of the loopback address to obtain the source address to generate the first SRv6 OAM packet ⟋~ S4012 the first SRv6 OAM packet is sent to a destination node, so that if the destination node, after receiving the first SRv6 OAM packet, determines according to the network segment and the host segment that the source address in the first SRv6 OAM packet belongs to a specified slice network segment, the destination node clears the slice segment in the source address, uses the source address whose slice segment has been cleared as the destination address of a second SRv6 OAM packet, and sends the second SRv6 OAM packet to the head node ⟋~ S402 the second SRv6 OAM packet is received ⟋~ S403 if the destination address is the same as a host address of the head node, the second SRv6 OAM packet is delivered up to a control plane. ⟋~ S404

FIG. 5

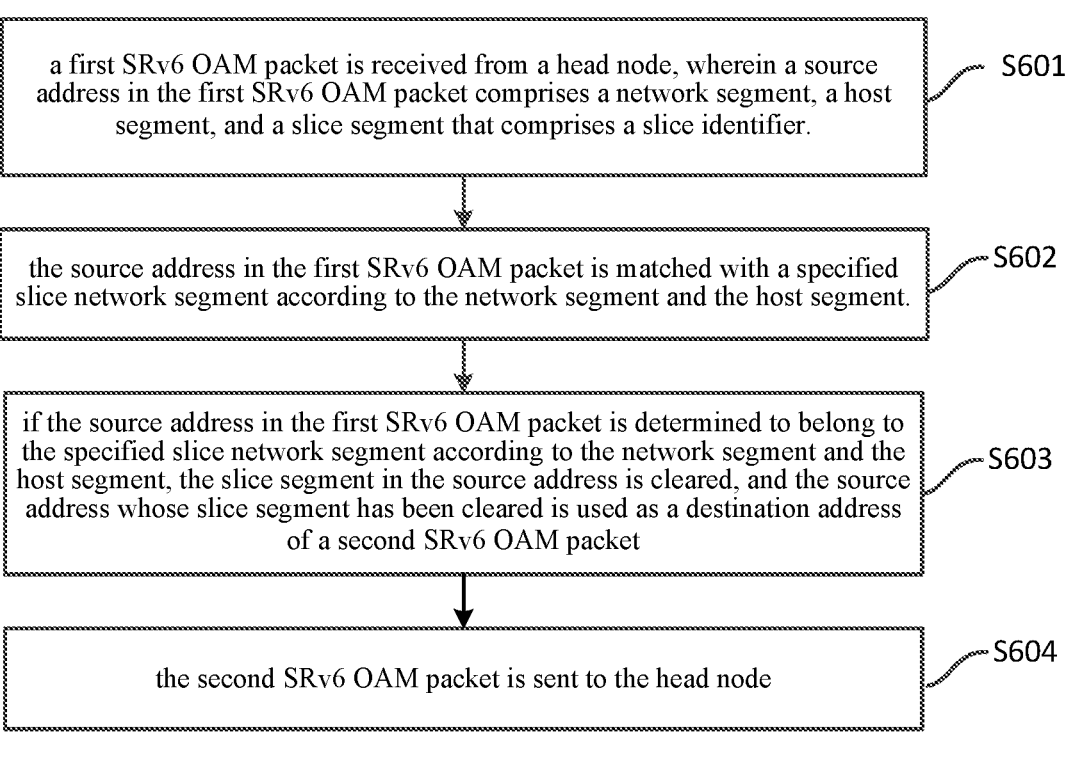

a first SRv6 OAM packet is received from a head node, wherein a source address in the first SRv6 OAM packet comprises a network segment, a host segment, and a slice segment that comprises a slice identifier.          S601 the source address in the first SRv6 OAM packet is matched with a specified slice network segment according to the network segment and the host segment.          S602 if the source address in the first SRv6 OAM packet is determined to belong to the specified slice network segment according to the network segment and the host segment, the slice segment in the source address is cleared, and the source address whose slice segment has been cleared is used as a destination address of a second SRv6 OAM packet          S603 the second SRv6 OAM packet is sent to the head node          S604

FIG. 6

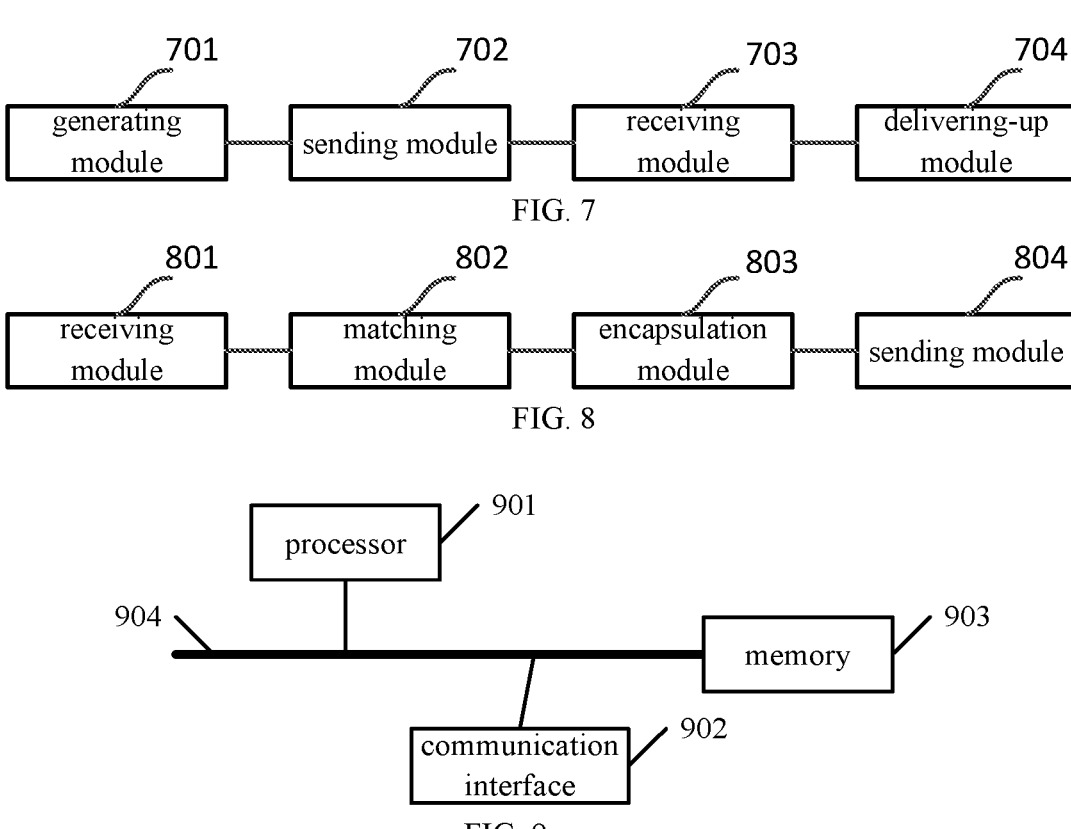

701 generating module   702 sending module   703 receiving module   704 delivering-up module

FIG. 7

801 receiving module   802 matching module   803 encapsulation module   804 sending module

FIG. 8

901 processor 904   903 memory 902 communication interface

FIG. 9

PACKET PROCESSING METHOD AND APPARATUS, AND NETWORK DEVICE AND MEDIUM

RELATED DISCLOSURES

This disclosure is a national stage entry of Int. Pat. App. No. PCT/CN2021/122183 filed Sep. 30, 2021, which is hereby incorporated in its entirety herein by reference.

TECHNICAL FIELD

The present disclosure relates to the technical field of communications, and specifically relates to a method, an apparatus for processing a packet, a network device, and a medium.

BACKGROUND

Network slicing is an on-demand networking method that can separate multiple virtual end-to-end networks on the same network. On the control plane, a network topology can be sliced into multiple topologies, and then resources in the topologies are further sliced through a controller, and bandwidth resources are reserved for each slice. Through network slicing, different Service Level Agreements (SLA) guarantees can be provided for different businesses.

When a forwarding plane processes packets, a slice can be associated with a pre-allocated hardware queue, thereby reserving designated bandwidth resources for the slice. Taking the Segment Routing IPv6 (SRv6) scenario as an example, when an original packet enters a carrier network, a head node in the carrier network performs IPv6 encapsulation on the original packet to obtain an encapsulated packet. The lower N bits of Internet Protocol version 6 (IPv6) address carry a slice ID. After receiving the encapsulated packet, an intermediate node in the carrier network can associate the pre-allocated hardware queue based on the slice ID carried in the encapsulated packet, and use the bandwidth resources corresponding to the hardware queue to forward the encapsulated packet.

In order to enable the intermediate node to identify whether the source IPV6 address of the encapsulated packet carries the slice ID, it is necessary to plan a slice network segment dedicated to a slice domain in advance, and it is necessary to configure a network segment for each node in the slice domain. For example, the slice network segment of the slice domain is 2001:2002:2003:2004::/64, and a slice network segment configured for the head node in the slice domain is 2001:2002:2003:2004:nodeid::/96, and the nodeid is a node identifier of the head node.

Currently, the host bits of the slice network segment can be used to carry the slice ID. For example, when the head node sends Operation, Administration, and Maintenance (OAM) packets to another node in the slice domain, it is assumed that if the slice ID is 1, the node identifier of the head node is 2, then the source IPV6 address of the OAM packet is 2001:2002:2003:2004:0000:0002::1, where "2001:2002:2003:2004:0000:0002" is the network segment of the source IPV6 address, and "0000:0001" is the host segment of the source IPV6 address.

A node that receives the OAM packet will exchange the source IPV6 address and the destination IPv6 address of the OAM packet to generate a response packet for the OAM packet, and send the response packet to the head node. In other words, the destination IPv6 address in the response packet is the address carrying the slice ID: 2001:2002:2003:

2004:0000:0002::1, and the destination IPv6 address is inconsistent with the host address of the head node. In the case of massive slices, there will be a large number of destination addresses for response packets. How the head node, after receiving these response packets, enables these response packets to be correctly delivered up to a control plane is a problem that needs to be solved urgently.

SUMMARY

The object of the examples of the present disclosure is to provide a method, an apparatus for processing a packet, a network device, and a medium, so as to solve a problem that a response packet for a OAM packet cannot be delivered up to a control panel. The specific solutions are as follows.

In a first aspect, an example of the present disclosure provides a method for processing a packet, which is applied to a head node in a SRv6 network, comprising:

generating a first SRv6 OAM packet, wherein a source address in the first SRv6 OAM packet comprises a network segment, a host segment, and a slice segment that comprises a slice identifier;

sending the first SRv6 OAM packet to a destination node, so that if the destination node, after receiving the first SRv6 OAM packet, determines according to the network segment and the host segment that the source address in the first SRv6 OAM packet belongs to a specified slice network segment, the destination node clears the slice segment in the source address, uses the source address whose slice segment has been cleared as a destination address of a second SRv6 OAM packet, and sends the second SRv6 OAM packet to the head node;

receiving the second SRv6 OAM packet that comprises the destination address; and if the destination address is the same as a host address of the head node, delivering the second SRv6 OAM packet up to a control plane.

In a possible example, a loopback address of the head node comprises a network segment, a host segment, and a slice segment with slice bits of 0, and the host segment comprised in the loopback address comprises a node identifier of the head node; and generating the first SRv6 OAM packet comprises:

obtaining a slice identifier of a slice to which the head node and the destination node belong, wherein the slice identifier belongs to the specified slice network segment; and filling the slice identifier in the slice segment of the loopback address to obtain the source address to generate the first SRv6 OAM packet.

In a possible example, before generating the first SRv6 OAM packet, the method further comprises:

generating a routing advertisement packet that comprises the loopback address; and sending the routing advertisement packet to a node other than the head node in the SRv6 network, so that the node receiving the routing advertisement packet generates a forwarding entry based on the loopback address.

In a second aspect, an example of the present disclosure provides a method for processing a packet, which is applied to a destination node in a SRv6 network, comprising:

receiving a first SRv6 OAM packet from a head node, wherein a source address in the first SRv6 OAM packet comprises a network segment, a host segment, and a slice segment that comprises a slice identifier;

matching the source address in the first SRv6 OAM packet with a specified slice network segment according to the network segment and the host segment;

if the source address in the first SRv6 OAM packet is determined to belong to the specified slice network segment according to the network segment and the host segment, clearing the slice segment in the source address, and using the source address whose slice segment has been cleared as a destination address of a second SRv6 OAM packet; and sending the second SRv6 OAM packet to the head node.

In a possible example, clearing the slice segment in the source address comprises:

clearing the slice segment in the source address based on pre-configured slice bit length information.

In a possible example, before receiving the first SRv6 OAM packet from the head node, the method further comprises:

receiving a routing advertisement packet sent by the head node, wherein the routing advertisement packet comprises a loopback address of the head node, the loopback address comprises a network segment, a host segment, and a slice segment with slice bits of 0, and the host segment comprised in the loopback address comprises a node identifier of the head node; and generating a forwarding entry based on the loopback address.

In a third aspect, an example of the present disclosure provides an apparatus for processing a packet, which is applied to a head node in a SRv6 network, comprising:

a generating module to generate a first SRv6 OAM packet, wherein a source address in the first SRv6 OAM packet comprises a network segment, a host segment, and a slice segment that comprises a slice identifier;

a sending module to send the first SRv6 OAM packet to a destination node, so that if the destination node, after receiving the first SRv6 OAM packet, determines according to the network segment and the host segment that the source address in the first SRv6 OAM packet belongs to a specified slice network segment, the destination node clears the slice segment in the source address, uses the source address whose slice segment has been cleared as a destination address of a second SRv6 OAM packet, and sends the second SRv6 OAM packet to the head node;

a receiving module to receive the second SRv6 OAM packet that comprises the destination address; and a delivering-up module to deliver the second SRv6 OAM packet up to a control plane if the destination address is the same as a host address of the head node.

In a possible example, a loopback address of the head node comprises a network segment, a host segment, and a slice segment with slice bits of 0, and the host segment comprised in the loopback address comprises a node identifier of the head node: the generating module is specifically to:

obtain a slice identifier of a slice to which the head node and the destination node belong, wherein the slice identifier belongs to the specified slice network segment;

fill the slice identifier in the slice segment of the loopback address to obtain the source address to generate the first SRv6 OAM packet.

In a possible example, the generating module is further to generate a routing advertisement packet that comprises the loopback address; and the sending module is further to send the routing advertisement packet to a node other than the head node in the SRv6 network, so that the node receiving the routing advertisement packet generates a forwarding entry based on the loopback address.

In a fourth aspect, an example of the present disclosure provides an apparatus for processing a packet, which is applied to a destination node in a SRv6 network, comprising:

a receiving module to receive a first SRv6 OAM packet from a head node, wherein a source address in the first SRv6 OAM packet comprises a network segment, a host segment, and a slice segment that comprises a slice identifier;

a matching module to match the source address in the first SRv6 OAM packet with a specified slice network segment according to the network segment and the host segment;

an encapsulation module to clear the slice segment in the source address and use the source address whose slice segment has been cleared as a destination address of a second SRv6 OAM packet if the source address in the first SRv6 OAM packet is determined to belong to the specified slice network segment according to the network segment and the host segment; and a sending module to send the second SRv6 OAM packet to the head node.

In a possible example, the encapsulation module is specifically to clear the slice segment in the source address based on pre-configured slice bit length information.

In a possible example, the apparatus further comprises a generating module:

the receiving module is further to receive a routing advertisement packet sent by the head node, wherein the routing advertisement packet comprises a loopback address of the head node, the loopback address comprises a network segment, a host segment, and a slice segment with slice bits of 0, and the host segment comprised in the loopback address comprises a node identifier of the head node; and the generating module is to generate a forwarding entry based on the loopback address.

In a fifth aspect, an example of the present disclosure further provides a network device, which comprises a processor, a communication interface, a memory, and a communication bus; wherein the processor, the communication interface, and the memory are communicated with each other through the communication bus:

the memory is to store computer programs; and the processor is to implement the method for processing a packet in the first aspect or in the second aspect when executing the programs stored on the memory.

In a sixth aspect, an example of the present disclosure further provides a computer-readable storage medium which stores computer programs that, when executed by a processor, cause the processor to implement the method for processing a packet in the first aspect or in the second aspect.

In a seventh aspect, an example of the present disclosure further provides a computer program product containing instructions that, when running on a computer, causes the computer to implement the method for processing a packet in the first aspect or in the second aspect.

By applying the technical solution, since the source address in the first SRv6 OAM packet generated by the head node comprises a network segment, a host segment, and a slice segment, if the destination node, after receiving the first SRv6 OAM packet, determines according to the network segment and the host segment that the source address belongs to a specified slice network segment, the destination node may clear the slice segment in the source address, and use the source address whose slice segment has been cleared as the destination address of the second SRv6 OAM packet. Since the host address of the head node is usually composed of the network segment and the host segment, after the slice segment in the source address is cleared, the host address of the head node is obtained. In other words, the destination address in the second SRv6 OAM packet received by the head node is its own host address, and then the forwarding plane of the head node can correctly deliver the second SRv6 OAM packet up to the control plane.

Of course, the implementation of any product or method in the present disclosure does not necessarily need to achieve all the advantages described above at the same time.

BRIEF DESCRIPTION OF THE DRAWINGS

In order to more clearly describe the technical solutions of the examples of the present disclosure or of the prior art, drawings that need to be used in examples and the prior art will be briefly described below. Obviously, the drawings provided below are for only some examples of the present disclosure; those skilled in the art can also obtain other examples based on these drawings without any creative efforts.

FIG. 4 is a flowchart of a method for processing a packet according to an example of the present disclosure;

FIG. 5 is a flowchart of another method for processing a packet according to an example of the present disclosure;

FIG. 6 is a flowchart of another method provided for processing a packet according to an example of the present disclosure;

FIG. 7 is a schematic structural diagram of an apparatus for processing a packet according to an example of the present disclosure;

FIG. 8 is a schematic structural diagram of another apparatus for processing a packet according to an example of the present disclosure; and FIG. 9 is a schematic structural diagram of a network device according to an example of the present disclosure.

DETAILED DESCRIPTION

Figures 1, 2, 3:
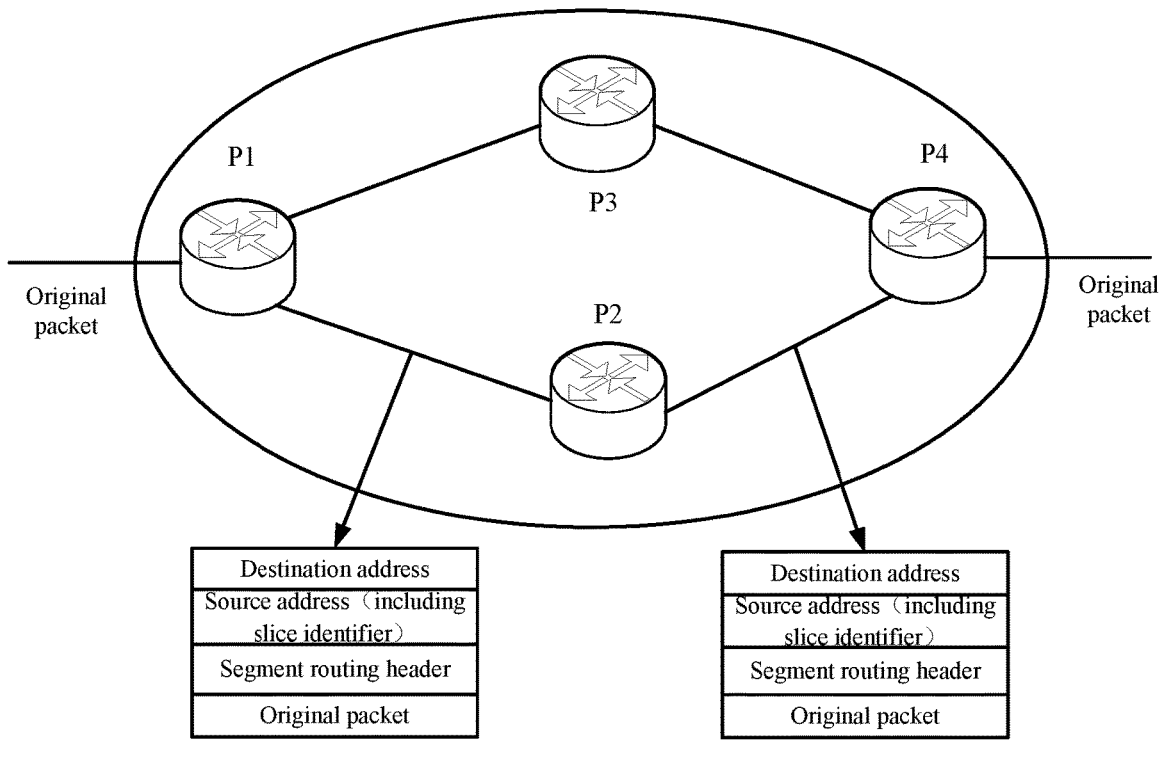
FIG. 1 is an architecture diagram of a SRv6 network according to an example of the present disclosure.
FIG. 2 is a schematic diagram of a segmented structure of a source address in the prior arts.
FIG. 3 is a schematic diagram of a segmented structure of a source address according to an example of the present disclosure.

In order to make the objectives, technical solutions, and advantages of the present disclosure clearer and more understandable, the present disclosure will be described in more detail below with reference to the appended drawings and examples. Obviously, the described examples are only some, and not all, of the examples of the present disclosure. All other examples obtained based on the examples of the present disclosure by those skilled in the art without any creative efforts fall into the scope of protection defined by the present disclosure.

First, an application scenario of an example of the present disclosure is introduced. The example of the present disclosure may be applied in a SRv6 network that is a slice network. For example, as shown in FIG. 1, the SRv6 network comprises four nodes, i.e., P1, P2, P3, and P4. P1 is the head node and P4 is the tail node.

Taking an example of the SRv6 network shown in FIG. 1, after receiving an original packet, the P1 node may perform IPv6 encapsulation on the original packet. During the IPV6 encapsulation, a slice identifier (Slice ID) may be carried in a source address in the IPV6 header. The encapsulated original packet comprises a destination address (DA), the source address (SA) carrying the slice ID, a segment routing header (SRH) and the original packet.

It can be seen from FIG. 1 that a packet carrying a slice identifier is transmitted between P1 and P2, and a packet carrying a slice identifier is also transmitted between P2 and P3. The P4 node decapsulates the received encapsulated packet so that the original packet is recovered, and forwards the original packet according to the destination address of the original packet.

In the prior arts, it is necessary to configure a network segment for each node in a slice domain. For example, a slice prefix has 32 bits, a node ID has 16 bits, and a slice ID has 32 bits. It is assumed that the network segment used to deploy a slice is 2001:2002:2003:2004::/64, a slice network segment that needs to be configured for the head node in the slice network is 2001:2002:2003:2004:nodeid::/96. As shown in FIG. 2, the source address comprises a network segment and a host segment. In the prior arts, the slice identifier is carried through the host segment.

For example, Table 1 shows two source addresses that carry slice identifiers.

TABLE 1

| Slice Identifier | Node Identifier | Source Address |
|---|---|---|
| 1 | 2 | 2001:2002:2003:2004:0000:0002::1 |
| 5 | 8 | 2001:2002:2003:2004:0000:0008::5 |

In the source address 2001:2002:2003:2004:0000:0002::1, "2001:2002:2003:2004:0000:0002" belongs to the network segment, and "0000:0001" belongs to the host segment. That is, the host segment comprises the slice identifier 1.

In the source address 2001:2002:2003:2004:0008::5, "2001:2002:2003:2004:0000:0008" belongs to the network segment, and "0000:0005" belongs to the host segment. That is, the host segment comprises the slice identifier 5.

In the example of the present disclosure, in order to ensure that a second SRv6 OAM packet is correctly delivered up to a control plane, another segmentation process is performed on the source address carrying the slice identifier. As shown in FIG. 3, in the example of the present disclosure, a new segment is added in the source address, i.e., the source address may be divided into three segments, which are respectively a network segment, a host segment, and a slice segment that is used to carry the slice identifier. The source address has 128 bits in total, the network segment may have 80 bits, the host segment may have 16 bits, and the slice segment may have 32 bits. Alternatively, the network segment has 64 bits, and the host segment and the slice segment both have 32 bits. The lengths of the network segment, the host segment, and the slice segment may be configured according to actual requirements, which is not limited in the example of the present disclosure.

As an example, the network segment has 64 bits, the slice segment and the host segment both have 32 bits. Again using the network segment 2001:2002:2003:2004::/64 as an example, the source address is still finally presented in the form of the source address shown in the above Table 1, but the segmentation method has been changed.

For example, in the source address 2001:2002:2003:2004:0000:0002::1, "2001:2002:2003:2004:" belongs to the network segment, "0000:0002:" belongs to the host segment, and "0000:0001" belongs to the slice segment.

In the source address 2001:2002:2003:2004:0000:0008::5, "2001:2002:2003:2004:" belongs to the network segment, "0000:0008:" belongs to the host segment, and "0000:0005" belongs to the slice segment.

It should be noted that the nodes in the examples of the present disclosure may also be referred to as node devices, and the node devices may be routers, switches, and the like.

A method for processing a packet according to an example of the present disclosure is described in detail in combination with the foregoing packet segmentation method.

An example of the present disclosure provides a method for processing a packet, which is applied to a head node in a SRv6 network. As shown in FIG. 4, the method comprises:

S401, a first SRv6 OAM packet is generated, wherein a source address in the first SRv6 OAM packet comprises a network segment, a host segment, and a slice segment that comprises a slice identifier.

The first SRv6 OAM packet is used to detect the connectivity of a SRv6 path and locate a failed node in the SRv6 path.

The first SRv6 OAM packet may specifically be a ping packet, a traceroute packet, a Bidirectional Forwarding Detection (BFD), etc. The ping packet is used to detect whether a node in a slice is reachable in a slice domain, and the traceroute packet is used to detect whether a node in a slice is reachable, and may also be used to analyze which node has failed.

S402, the first SRv6 OAM packet is sent to a destination node, so that if the destination node, after receiving the first SRv6 OAM packet, determines according to the network segment and the host segment that the source address in the first SRv6 OAM packet belongs to a specified slice network segment, the destination node clears the slice segment in the source address, uses the source address whose slice segment has been cleared as the destination address of a second SRv6 OAM packet, and sends the second SRv6 OAM packet to the head node.

The destination node is another node that belongs to the same SRv6 network as the head node. For example, if the head node is the P1 node in FIG. 1, the destination node may be the P2 node, P3 node, or P4 node in FIG. 1.

If the network segment used by the head node is 2001:2002:2003:2004::/64, the specified slice network segment may be "2001:2002:2003:2004:nodeid::", and the nodeid is the node identifier of the head node.

It is assumed that the node identifier of the head node is 2, the source address in the first SRv6 OAM packet is 2001:2002:2003:2004:0000:0002::1, and the source address "2001:2002:2003:2004:" belongs to the network segment, "0000:0002:" belongs to the host segment, and "0000:0001" belongs to the slice segment.

It can be seen that the source address belongs to the specified slice network segment 2001:2002:2003:2004:0000:0002::, so the destination node may clear the slice segment comprised in the source address to obtain 2001:2002:2003:2004:0000:0002::, and then use 2001:2002:2003:2004:0000:0002:: as the destination address of the second SRv6 OAM packet, and use the destination address comprised in the first SRv6 OAM packet as the source address in the second SRv6 OAM packet.

In the example of the present disclosure, if the first SRv6 OAM packet is a ping packet, the second SRv6 OAM packet is a response packet for the ping packet.

If the first SRv6 OAM packet is a traceroute packet, the second SRv6 OAM packet is an Internet Control packet Protocol (ICMP) timeout packet.

If the first SRv6 OAM packet is a BFD packet, the second SRv6 OAM packet is a BFD response packet.

S403, the second SRv6 OAM packet is received.

The second SRv6 OAM packet comprises a destination address, and the destination address is 2001:2002:2003:2004:0000:0002::.

S404, if the destination address is the same as a host address of the head node, the second SRv6 OAM packet is delivered up to a control plane.

Based on the working principle of the forwarding plane of a node, if the forwarding plane of the node receives a packet with a destination address being the host address of the node itself, the received packet is delivered up to the control plane. In the example of the present disclosure, after receiving the second SRv6 OAM packet, the forwarding plane of the head node may obtain the destination address 2001:2002:2003:2004:0000:0002:: in the second SRv6 OAM packet. Since this destination address does not carry a slice ID and is the same as the host address of the head node, the second SRv6 OAM packet can be delivered up to the control plane.

By applying the method, since the source address in the first SRv6 OAM packet generated by the head node comprises a network segment, a host segment, and a slice segment, if the destination node, after receiving the first SRv6 OAM packet, determines according to the network segment and the host segment in the source address that the source address belongs to a specified slice network segment, the destination node may clear the slice segment in the source address, and use the source address whose slice segment has been cleared as the destination address of the second SRv6 OAM packet. Since the host address of the head node is usually composed of the network segment and the host segment, after the slice segment in the source address is cleared, the host address of the head node is obtained. In other words, the destination address in the second SRv6 OAM packet received by the head node is its own host address, and then the forwarding plane of the head node can correctly deliver the second SRv6 OAM packet up to the control plane.

In the example of the present disclosure, a loopback address may be configured for the head node in advance, and may be configured as the source address of the slice. The loopback address comprises a network segment, a host segment, and a slice segment with slice bits of 0. The host segment comprised in the loopback address comprises the node identifier of the head node. In the example of the present disclosure, the head node uses the loopback address as its host address.

For example, the loopback address is 2001:2002:2003:2004:nodeid::/128.

On the basis of the above example, as shown in FIG. 5, the process of generating a first SRv6 OAM packet by the head node at S401 comprises:

S4011, a slice identifier of a slice to which the head node and the destination node belong is obtained, the slice identifier belongs to a specified slice network segment.

S4012, the slice identifier is filled in the slice segment of the loopback address to obtain the source address to generate the first SRv6 OAM packet.

The slice bits in the slice segment of the loopback address are all 0. When the slice identifier needs to be carried in a packet, the slice identifier that needs to be carried may be directly filled in the slice segment of the loopback address, so as to use the obtained address as the source address in the packet.

In the generation of the first SRv6 OAM packet, the slice identifier of the slice to which the head node and the destination node belong may be directly filled in the slice segment of the loopback address, so as to use the obtained address as the source address in the first SRv6 OAM packet.

For example, if the node identifier of the head node is 5, the loopback address is 2001:2002:2003:2004:0000:0005::/128. If the slice identifier of the slice to which the head node and the destination node belong is 3, the slice identifier 3 may be filled into the slice segment of the loopback address to obtain the source address 2001:2002:2003:2004:0000:0005::3.

By applying the method, in the generation of the first SRv6 OAM packet, only the slice identifier that needs to be carried needs to be filled into the slice segment of the loopback address of the head node to generate the source address, which is simple to be implemented. In addition, since the host segment and the slice segment in the source address are configured independently in the example of the present disclosure, if the destination node, after receiving the first SRv6 OAM packet, determines that the first SRv6 OAM packet belongs to the specified slice network segment, the destination node clears the slice segment. In this way, the host address of the head node can be recovered, and then can be used as the destination address of the second SRv6 OAM packet. The head node can naturally support delivering the second SRv6 OAM packet up to the control plane without need of additional matching operations.

In the prior arts, the slice identifier is carried in the host segment, and the destination node cannot delete the slice identifier in the host segment. In order to enable the second SRv6 OAM packet to be delivered up to the control plane, the control plane of the head node may send all addresses with the slice identifier as the host address down to the forwarding plane. In this way, if the destination address of the packet received by the forwarding plane carries the slice identifier, the forwarding plane may also deliver the packet up to the control plane. However, the slice network segment is very large, and correspondingly, there are many addresses that carry the slice identifier. The control plane sends the addresses carrying the slice identifier down to the forwarding plane one by one, which consumes a lot of resources.

In contrast, in the example of the present disclosure, the destination node can recover the host address of the head node that does not carry the slice identifier. The destination address of the second SRv6 OAM packet returned by the destination node to the head node does not carry the slice identifier. Therefore, in order to enable the second SRv6 OAM packet to be delivered up to the control plane, the control plane of the head node in the example of the present disclosure only needs to send the local address down to the forwarding plane. There is no need to send the addresses carrying the slice identifier down one by one, which can reduce resource consumption.

In another example of the present disclosure, before the process shown in FIG. 4, the method further comprises:

generating a routing advertisement packet that comprises the loopback address; and sending the routing advertisement packet to a node other than the head node in the SRv6 network, so that the node receiving the routing advertisement packet generates a forwarding entry based on the loopback address.

For example, the head node sends a routing advertisement packet to the destination node. After the destination node receives the routing advertisement packet, a next hop in the forwarding entry generated by the destination node is the loopback address carried in the routing advertisement packet.

For example, if the loopback address is 2001:2002:2003:2004:nodeid::/128, the prefix of the forwarding entry generated by the destination node is 2001:2002:2003:2004:nodeid:, and the outgoing interface is an interface, which is connected to the head node, on the destination node, the next hop is the address of a physical interface of a device connected to the destination node among the devices comprised in the path from the destination node to the head node.

In the case of a direct connection between the head node and the destination node, the next hop in the forwarding entry generated by the destination node is the physical address of the interface, which is connected to the destination node, on the head node.

For example, if the head node is node 1, the physical interface A of node 1 is connected to node 2, and the physical interface B of node 2 is connected to node 3, the next hop in the forwarding entry generated by node 2 is the physical interface of physical interface A, and the next hop in the forwarding entry generated by node 3 is the physical address of physical interface B.

It can be understood that a node receiving the routing advertisement packet may also generate a forwarding entry in the same way.

In the example of the present disclosure, the head node advertises the loopback address as a normal host address. Accordingly, another node may generate a forwarding entry based on the loopback address, so as to send the second SRv6 OAM packet without carrying the slice identifier to the head node based on the generated forwarding entry. Compared with the prior arts, in the example of the present disclosure, the network segment that needs to be specially maintained by the head node (the network segment configured for each node) is simplified into the host address of the head node, so that there is no need to specially maintain the network segment, this processing is closer to the processing of the head node itself in logic, which simplifies the processing of the head node.

Corresponding to the foregoing example, an example of the present disclosure further provides a method for processing a packet, which is applied to a destination node in a SRv6 network. As shown in FIG. 6, the method comprises:

S601, a first SRv6 OAM packet is received from a head node, wherein a source address in the first SRv6 OAM packet comprises a network segment, a host segment, and a slice segment that comprises a slice identifier.

Wherein, the host segment comprises the node identifier of the head node.

S602. the source address in the first SRv6 OAM packet is matched with a specified slice network segment according to the network segment and the host segment.

For example, if the source address in the first SRv6 OAM packet is 2001:2002:2003:2004:0000:0002::1, where "2001:2002:2003:2004:" belongs to the network segment, "0000:0002:" belongs to the host segment. It can be seen that the source address belongs to the specified slice network segment 2001:2002:2003:2004:0000:0002::.

S603, if the source address in the first SRv6 OAM packet is determined to belong to the specified slice network segment according to the network segment and the host segment, the slice segment in the source address is cleared, and the source address whose slice segment has been cleared is used as a destination address of a second SRv6 OAM packet.

Each node in the SRv6 network is configured with a specified slice network segment and slice bit length information. If the destination node, after receiving the first SRv6 OAM packet, determines that the source address in the first SRv6 OAM packet belongs to the specified slice network segment, the destination node can determine that the source address carries the slice identifier, and then may clear the slice segment comprised in the source address based on the pre-configured slice bit length information to obtain the host address of the head node.

For example, if the slice bit length information indicates lower 16 bits, then the destination node may clear the lower 16 bits of the source address. Alternatively, if the slice bit length information indicates lower 32 bits, the destination node may clear the lower 32 bits of the source address.

S604, the second SRv6 OAM packet is sent to the head node.

By applying the method, the source address in the first SRv6 OAM packet received by the destination node comprises a network segment, a host segment, and a slice segment. Therefore, in case that the destination node determines that the first SRv6 OAM packet is matched with a specified slice network segment, the destination node may directly clear the slice segment in the source address, and use the source address whose slice segment has been cleared as the destination address of the second SRv6 OAM packet. Since the host address of the head node is usually composed of the network segment and the host segment, after clearing the slice segment in the source address, the host address of the head node is obtained. In other words, the destination address in the second SRv6 OAM packet received by the head node is its own host address, and the forwarding plane of the head node can correctly deliver the second SRv6 OAM packet up to the control plane.

In another example of the present disclosure, before the process in the example shown in FIG. 6, the method further comprises:

receiving a routing advertisement packet sent by the head node, wherein the routing advertisement packet comprises a loopback address of the head node, the loopback address comprises a network segment, a host segment, and a slice segment with slice bits of 0, and the host segment comprised in the loopback address comprises a node identifier of the head node; and generating a forwarding entry based on the loopback address.

For example, after the destination node receives the routing advertisement packet, the next hop of the forwarding entry generated by the destination node is the loopback address carried in the routing advertisement packet.

For example, if the loopback address is 2001:2002:2003:2004:nodeid::/128, the prefix of the forwarding entry generated by the destination node is 2001:2002:2003:2004:nodeid:, and the outgoing interface is an interface, which is connected to the head node, on the destination node, and the next hop is the address of a physical interface of a device connected to the destination node among the devices comprised in the path from the destination node to the head node.

Based on this, in the S604, the destination node may send the second SRv6 OAM packet to the head node according to the forwarding entry.

By applying the method, each node in the SRv6 network generates a forwarding entry based on the loopback entry, so that the second SRv6 OAM packet that does not carry the slice identifier is sent to the head node according to the forwarding entry, so that the forwarding plane of the head node may deliver the second SRv6 OAM packet up to the control plane, and there is no need to configure a complicated matching mechanism for the head node, which can avoid the situation that the second SRv6 OAM packet cannot be delivered up to the control plane.

Corresponding to the foregoing method example, an example of the present disclosure also provides an apparatus for processing a packet, which is applied to a head node in a SRv6 network. As shown in FIG. 7, the apparatus comprises:

a generating module 701 to generate a first SRv6 OAM packet, wherein a source address in the first SRv6 OAM packet comprises a network segment, a host segment, and a slice segment that comprises a slice identifier;

a sending module 702 to send the first SRv6 OAM packet to a destination node, so that if the destination node, after receiving the first SRv6 OAM packet, determines according to the network segment and the host segment that the source address in the first SRv6 OAM packet belongs to a specified slice network segment, the destination node clears the slice segment in the source address, uses the source address whose slice segment has been cleared as a destination address of a second SRv6 OAM packet, and sends the second SRv6 OAM packet to the head node;

a receiving module 703 to receive the second SRv6 OAM packet that comprises the destination address; and a delivering-up module 704 to deliver the second SRv6 OAM packet up to a control plane if the destination address is the same as a host address of the head node.

In another example of the present disclosure, the loopback address of the head node comprises a network segment, a host segment, and a slice segment with slice bits of 0, and the host segment comprised in the loopback address comprises a node identifier of the head node.

The generating module 701 is specifically to:

obtain a slice identifier of a slice to which the head node and the destination node belong, wherein the slice identifier belongs to the specified slice network segment;

fill the slice identifier in the slice segment of the loopback address to obtain the source address to generate the first SRv6 OAM packet.

In another example of the present disclosure, the generating module 701 is further to generate a routing advertisement packet that comprises the loopback address; and the sending module 702 is further to send the routing advertisement packet to a node other than the head node in the SRv6 network, so that the node receiving the routing advertisement packet generates a forwarding entry based on the loopback address.

Corresponding to the foregoing method example, an example of the present disclosure further provides another apparatus for processing a packet, which is applied to a destination node in a SRv6 network. As shown in FIG. 8, the apparatus comprises:

a receiving module 801 to receive a first SRv6 OAM packet from a head node, wherein a source address in the first SRv6 OAM packet comprises a network segment, a host segment, and a slice segment that comprises a slice identifier;

a matching module 802 to match the source address in the first SRv6 OAM packet with a specified slice network segment according to the network segment and the host segment;

an encapsulation module 803 to clear the slice segment in the source address, and use the source address whose slice segment has been cleared as a destination address of a second SRv6 OAM packet if the source address in the first SRv6 OAM packet is determined to belong to the specified slice network segment according to the network segment and the host segment; and a sending module 804 to send the second SRv6 OAM packet to the head node.

In another example of the present disclosure, the encapsulation module 803 is specifically to clear the slice segment in the source address based on pre-configured slice bit length information.

In another example of the present disclosure, the apparatus further comprises a generating module:

the receiving module 801 is further to receive a routing advertisement packet sent by the head node, wherein the routing advertisement packet comprises a loopback address of the head node, the loopback address comprises a network segment, a host segment, and a slice segment with slice bits of 0, and the host segment comprised in the loopback address comprises a node identifier of the head node; and the generating module is to generate a forwarding entry based on the loopback address.

An example of the present application further provides a network device, which may be a head node or a destination node in the above example. As shown in FIG. 9, the network device comprises a processor 901, a communication interface 902, a memory 903, and a communication bus 904, wherein the processor 901, the communication interface 902, and the memory 903 are communicated with each other through the communication bus 904;

the memory 903 is to store computer programs; and the processor 901 is to implement the methods in the above examples when executing the programs stored on the memory 903.

The communication bus for the electronic device may be a Peripheral Component Interconnect (PCI) bus or an Extended Industry Standard Architecture (EISA) bus or the like. The communication bus may be divided into an address bus, a data bus, a control bus and the like. For ease of representation, only one thick line is used in the figure, but it does not mean that there is only one bus or one type of bus.

The communication interface is used for the communication between the network device and other devices.

The memory may comprise a Random Access Memory (RAM), or a Non-volatile Memory (NVM), for example, at least one magnetic disk memory. In one example, the memory may also be at least one storage device located away from the processor.

The processor may be a general-purpose processor, including a Central Processing Unit (CPU), a Network Processor (NP), etc.; it may also be a Digital Signal Processor (DSP), an Application Specific Integrated Circuit (ASIC), a Field-Programmable Gate Array (FPGA) or other programmable logic devices, discrete gates or transistor logic devices, discrete hardware components.

Another example of the present disclosure further provides a computer-readable storage medium which stores computer programs that, when executed by a processor, cause the processor to implement any one of the methods for processing a packet.

Another example of the present disclosure further provides a computer program product containing instructions that, when running on a computer, causes the computer to implement any one of the methods for processing a packet.

The above examples may be all or partly implemented by software, hardware, firmware, or any combination thereof. When implemented by software, it may be all or partly implemented in the form of a computer program product. The computer program product includes one or more computer instructions. When the computer program instructions are loaded and executed on a computer, the procedures or functions described in accordance with the examples of the present disclosure will be realized in whole or in part. The computer may be a general-purpose computer, a special purpose computer, a computer network, or other programmable device. The computer instructions may be stored in a computer-readable storage medium or transmitted from one computer-readable storage medium to another computer-readable storage medium, for example, the computer instructions may be transmitted from one website, computer, server, or data center to another website, computer, server, or data center via wired (e.g., coaxial cable, fiber optic, Digital Subscriber Line (DSL)) or wireless (e.g., infrared, wireless, microwave, etc.) means. The computer-readable storage medium may be any usable medium that can be accessed by a computer or a data storage device, such as an integrated server, an integrated data center, etc., that includes one or more usable media. The usable media may be a magnetic media (e.g., a floppy Disk, a hard Disk, a magnetic tape), an optical media (e.g., DVD), or a semiconductor media (e.g., a Solid State Disk (SSD)), and the like.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the examples in the description are described in a correlated manner, and identical or similar parts in various examples can refer to one another. In addition, the description for each example focuses on the differences from other examples. In particular, the example of the apparatus is described briefly, since it is substantially similar to the example of the method, and the related contents can refer to the description of the example of the method.

The examples described above are simply preferable examples of the present disclosure, and are not intended to limit the scope of protection of the present disclosure. Any modifications, alternatives, improvements, or the like within the spirit and principle of the present application shall be included within the scope of protection of the present disclosure.

What is claimed is:

1. A method for processing a packet, which is applied to a head node in a Segment Routing over IPv6 SRv6 network, comprising:

generating a first SRv6 Operations, Administration, and Maintenance OAM packet, wherein a source address in the first SRv6 OAM packet comprises a network segment, a host segment, and a slice segment that comprises a slice identifier;

sending the first SRv6 OAM packet to a destination node, so that if the destination node, after receiving the first SRv6 OAM packet, determines according to the network segment and the host segment that the source address in the first SRv6 OAM packet belongs to a specified slice network segment, the destination node clears the slice segment in the source address, uses the source address whose slice segment has been cleared as a destination address of a second SRv6 OAM packet, and sends the second SRv6 OAM packet to the head node;

receiving the second SRv6 OAM packet that comprises the destination address; and if the destination address is the same as a host address of the head node, delivering the second SRv6 OAM packet up to a control plane.

2. The method of claim 1, wherein, a loopback address of the head node comprises a network segment, a host segment, and a slice segment with slice bits of 0, and the host segment comprised in the loopback address comprises a node identifier of the head node; and generating the first SRv6 OAM packet comprises:

obtaining a slice identifier of a slice to which the head node and the destination node belong, wherein the slice identifier belongs to the specified slice network segment; and filling the slice identifier in the slice segment of the loopback address to obtain the source address to generate the first SRv6 OAM packet.

3. The method of claim 2, wherein, before generating the first SRv6 OAM packet, the method further comprises:

generating a routing advertisement packet that comprises the loopback address; and sending the routing advertisement packet to a node other than the head node in the SRv6 network, so that the node receiving the routing advertisement packet generates a forwarding entry based on the loopback address.

4. A network device, which comprises a processor, a communication interface, a memory, and a communication bus, wherein the processor, the communication interface, and the memory are communicated with each other through the communication bus;

the memory is to store computer programs; and the processor is to implement the method of claim 1 when executing the programs stored on the memory.

5. A non-transitory computer-readable storage medium which stores computer programs that, when executed by a processor, cause the processor to implement the method of claim 1.

6. A method for processing a packet, which is applied to a destination node in a Segment Routing over IPv6 SRv6 network, comprising:

receiving a first SRv6 Operations, Administration, and Maintenance OAM packet from a head node, wherein a source address in the first SRv6 OAM packet comprises a network segment, a host segment, and a slice segment that comprises a slice identifier;

matching the source address in the first SRv6 OAM packet with a specified slice network segment according to the network segment and the host segment;

if the source address in the first SRv6 OAM packet is determined to belong to the specified slice network segment according to the network segment and the host segment, clearing the slice segment in the source address, and using the source address whose slice segment has been cleared as a destination address of a second SRv6 OAM packet; and sending the second SRv6 OAM packet to the head node.

7. The method of claim 6, wherein, clearing the slice segment in the source address comprises:

clearing the slice segment in the source address based on pre-configured slice bit length information.

8. The method of claim 6, wherein, before receiving the first SRv6 OAM packet from the head node, the method further comprises:

receiving a routing advertisement packet sent by the head node, wherein the routing advertisement packet comprises a loopback address of the head node, the loopback address comprises a network segment, a host segment, and a slice segment with slice bits of 0, and the host segment comprised in the loopback address comprises a node identifier of the head node; and generating a forwarding entry based on the loopback address.

9. A network device, which comprises a processor, a communication interface, a memory, and a communication bus, wherein the processor, the communication interface, and the memory are communicated with each other through the communication bus;

the memory is to store computer programs; and the processor is to implement the method of claim 6 when executing the programs stored on the memory.

10. A non-transitory computer-readable storage medium which stores computer programs that, when executed by a processor, cause the processor to implement the method of claim 6.

* * * * *